United States Patent Office 3,011,120
Patented Nov. 28, 1961

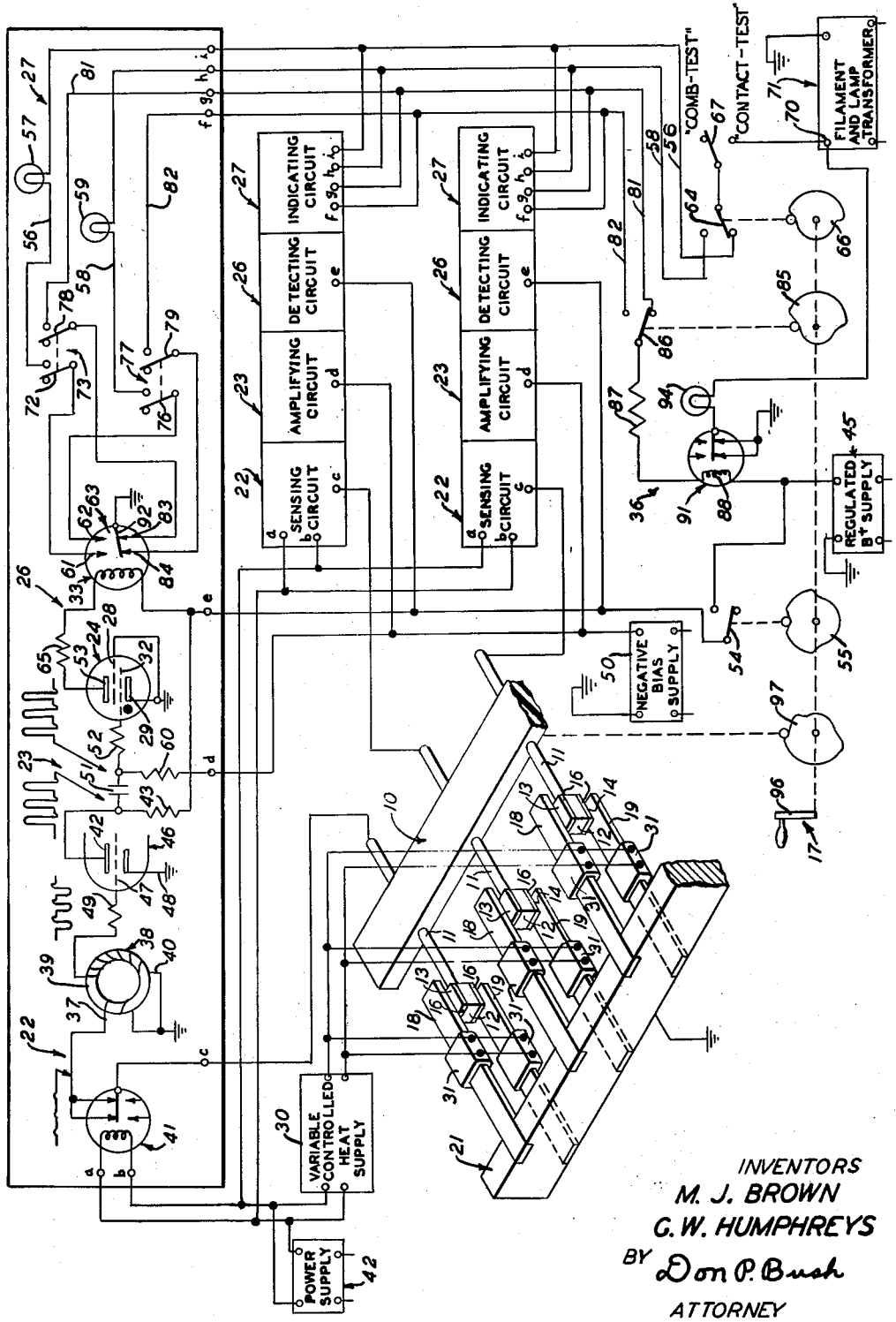

3,011,120
APPARATUS FOR IDENTIFYING METAL SURFACES
Martin J. Brown, Princeton, N.J., and George W. Humphreys, Downers Grove, Ill., assignors to Western Electric Company, Incorporated, New York, N.Y., a corporation of New York
Filed Mar. 10, 1960, Ser. No. 14,020
8 Claims. (Cl. 324—32)

The present invention relates to apparatus for determining the presence of a relatively thin layer of a specific metal on a member made of a dissimilar metal. The invention relates more particularly to apparatus for determining the presence or absence of a relatively thin coating or cap of a precious metal, such as palladium or the like, on a contact of a wire spring relay comb.

In order to reduce the cost of manufacturing wire spring relays, similar to those disclosed in "Bell Telephone System," Monograph 2693 and in a copending application Serial No. 14,027, filed on even dates herewith in the names of P. E. Anderson and R. O. Birchler, it is desirable to produce the various parts thereof on a mass production basis. Depending on the particular use to which the wire spring relay is subsequently placed, the combs of the relay need not have precious metal caps on all contact surfaces thereof. Therefore, excessive manufacturing costs would be involved if all contact surfaces on a wire spring relay comb were provided with a precious metal cap to insure that the required number of contact caps were provided. Since the service for which the particular relay is to be used may require only one or a relatively small number of such contacts, it is desirable to provide apparatus for verifying the presence of palladium caps on only those contacts of the wire spring relay combs, of a given code, which are required to have palladium caps thereon.

Copper-nickel alloy onto which the palladium caps are welded, and palladium of which the caps are made have nearly the same appearances. Also tool marks are made on the member of copper-nickel alloy on which the caps are welded during the formation of the copper-nickel member which make it appear as if palladium caps are present on the member. Therefore, visual inspection and inspection of the contacts with optical equipment are not practical or effective. Further, because of the manner in which the contacts are made, it is not practical to determine the presence or absence of the palladium caps by geometrical measurements. Also, because of the low magnitude of the electrical resistance of the various elements of the wire spring relay combs, it is not practical to utilize resistance measurements to check for the presence of palladium caps. Further, magnetic and eddy current devices are not sensitive enough to be utilized to determine the presence or absence of palladium contact caps.

In order to permit the use of a contact verification device in mass production manufacturing processes, the device must be such that each of the wire spring relay combs can be transported into a test position, be tested, and then be moved out of the device, to make room for a subsequent comb to be tested, in a time interval of the order of one second. This allows approximately one-tenth of a second for the actual testing time so that the remaining portion of the time can be utilized to allow acceptance or rejection circuitry to function properly.

It is, therefore, an object of the present invention to provide new and improved apparatus for determining the presence or absence of a relatively thin layer of a specific metal on a member made of a dissimilar metal.

Further, an object of the present invention is to provide new and improved apparatus for determining the presence or absence of a relatively thin coating or cap of a precious metal, such as palladium or the like, on a contact of a wire spring relay comb.

A further object of the present invention is to provide apparatus for detecting rapidly and accurately the presence or absence of precious metal contact caps on combs of wire spring relays.

A still further object of the present invention is to provide apparatus utilizing the "Seebeck" effect for determining the presence of relatively thin palladium contact caps on wire spring relay combs.

An apparatus for determining the presence of relatively thin layers of a specific precious metal on opposite sides of a member of dissimilar metal of an electrical contact of electrical equipment, embodying certain principles of the present invention, may include a furcated sensing electrode normally positioned astraddle an electrical contact of electrical equipment under test. The sensing electrode may have a pair of sensing probes constructed of a specific reference metal projecting on opposite sides of the contact under test.

The apparatus is provided with means for causing relative movement between the contact and the sensing probes of the sensing electrode for selectively causing pressing contact between one of the sensing probes and the corresponding side of the electrical contact and subsequently the other probe and corresponding side of the contact. The apparatus may also include means for heating the sensing probes to a predetermined temperature so that thermoelectric voltages are generated at the junctions between the heated sensing probes and electrical contact. The apparatus includes means connected to the sensing probes and the electrical contact for sensing and indicating the polarities and the orders of magnitude of the voltages.

Other objects and features of the present invention will be more readily understood from the following detailed description of a specific embodiment of a testing apparatus embodying certain principles of the present invention when read in conjunction with the accompanying drawing illustrating a perspective, diagrammatic view of portions of the structural features of a specific testing apparatus with portions thereof broken away for purposes of clarity, and portions of an electrical testing circuit shown schematically.

Referring now to the drawing wherein there is shown a fragmentary, schematic representation of a wire spring relay comb, designated generally by the numeral 10, to be tested. Normally, each wire spring relay comb 10 has twelve wire springs 11—11 (only three of which have been illustrated), each of which have a substantially rectangular member 12 of a copper-nickel metal alloy containing substantially seventy percent copper and substantially thirty percent nickel welded to a free end thereof. The code of the particular wire spring relay comb 10 determines which of upper contact surfaces 13—13 and lower contact surfaces 14—14 of the members 12—12 should have a thin piece of commercially pure palladium welded thereto to form a palladium contact cap 16 thereon.

The relay comb 10 is supported in a comb-retaining fixture, illustrated schematically and designated generally by the numeral 17, which places all twelve of the upper contact surfaces 13—13 or lower contact surfaces 14—14 on each side of the comb 10, under test, simultaneously, into individual engagement with separate upper sensing probes 18—18 or lower sensing probes 19—19. The upper sensing probes 18—18 and lower sensing probes 19—19 are made of commercially pure nickel and form part of a grounded, furcated sensing electrode, designated generally by the numeral 21. It should be noted that the sensing probes 18—18 and 19—19 could be made of a metal other than nickel. However, it is desirable to utilize nickel for this purpose because of the difference in a thermal E.M.F. generated when the probes 18—18 and 19—19 contact different metals which are involved in the specific relay combs being tested.

The contact surfaces 13—13 and 14—14 on opposite sides of the members 12—12 are tested successively. Therefore, since twelve contact surfaces 13—13 or 14—14 are being tested simultaneously, the specific testing device is provided with twelve, individual, identical sensing circuits, designated generally by the numeral 22, only one of which has been illustrated in detail. Each of the sensing circuits 22—22 are connected to an amplifying circuit, designated generally by the numeral 23, only one of which has been illustrated in detail. Each of the amplifying circuits 23—23 is connected to a relatively small, normally cut-off shield-grid, thyratron, designated generally by the numeral 24, in a detecting circuit, designated generally by the numeral 26, only one of which is illustrated in detail. The thyratron 24 is a type 572 thyratron and has a shield-grid 28 connected to the cathode 29 and to ground. Each of the detecting circuits 26—26 are, in turn, connected to an indicating circuit, designated generally by the numeral 27, only one of which is illustrated in detail.

Grounding of the relatively cold end of the sensing electrode 21 by clamping the electrode to the frame (not shown) of the apparatus, so that the main body of the electrode acts as a heat sink, simplifies the problem of maintaining a predetermined temperature differential between the opposite ends of the sensing probes 18—18 and 19—19. The active ends of nickel probes 18—18 and 19—19 of the sensing electrode 21, which engage the contact surfaces 13—13 and 14—14, are each heated, by individual electrical heating elements 31—31, to a temperature of 300° ±5° F. Electrical power is supplied to the heating elements 31—31 by a thermostatically controlled variable supply 30 which causes the heating elements to maintain the temperature of the sensing probes 18—18 and 19—19 at the desired level of 300° ±5° F. When each of the nickel probes 18—18 and 19—19 is placed in pressing contact with an associated one of the palladium caps 16—16, a thermal E.M.F. of the order of one-half millivolt is generated. A similar potential, except of opposite polarity, is generated between one of the nickel probes 18 or 19 and the member 12 of copper-nickel alloy metal in the absence of a palladium cap 16.

The thermal E.M.F., being generated at the juncture between each of the nickel probes 18—18 or 19—19 and one of the palladium caps 16—16, may be amplified sufficiently in the amplifying circuit 23 so that when the amplified thermal E.M.F. is applied to the grid 32 of the relatively small thyratron 24, in the detecting circuit 26, the thyratron 24 will fire to operate a mercury-contact relay, designated generally by the numeral 33, in the associated indicating circuit 27. The relays 33—33 are Wsetern Electric type 276B relays and cooperate to control an acceptance-rejection circuit, designated generally by the numeral 36.

The thermal E.M.F., which is generated when one of the heated nickel probes 18 or 19 is placed in pressing engagement with the associated palladium contact cap 16, drifts with time. This is due to the changing potential of the different junctions in the wire spring relay comb 10 as the heat penetrates the structure of the comb. However, only the thermal E.M.F. produced while the temperature differential exists across the thickness of the palladium cap 16 is of interest. The last-mentioned E.M.F. starts within a few milliseconds and lasts of the order of one second.

The thermal E.M.F. of one-half millivolt generated at the juncture of the probe 18 or 19 and the cap 16 is applied to one end of the primary 37 of a relatively small, toroidal, tape-wound, relatively high-ratio, step-up pulse transformer, designated generally by the numeral 38, the other end of the primary 37 being connected to one end of the secondary 40 of the transformer and to ground. The transformer 38 has a supermalloy core 39 with eight turns in the primary 37 and four-thousand turns in the secondary 40. Supermalloy is an extremely low energy-loss core material obtainable from Arnold Engineering Company, 350 Fifth Avenue, New York, New York.

The current produced by the generated thermal E.M.F. is passed through a type 276N, mercury-contact relay, designated generally by the numeral 41, which is utilized as a half-wave chopper to interrupt the current in the primary 37 of the transformer 38. The relay 41 is operated by a 60-cycle voltage source, designated generally by the numeral 42, so that one pulse is generated thereby every 16⅔ milliseconds. Accordingly, six pulses, of a wave shape as illustrated in the drawing, are generated by the relay 41 during the one-tenth second following the contact of the relatively hot nickel probe 18 or 19 with the palladium cap 16, which is the one-tenth second measuring interval that is utilized.

The stepped-up, secondary voltage of the transformer 38, is of the order of five volts and has a wave shape, as illustrated in the drawing, consisting of a train of oscillations which are highly damped due to the properties of the supermalloy core 39. The transformer 38 is poled so that when the positive voltage, resulting from one of the nickel testing probes 18 or 19 contacting one of the palladium contact caps 16—16, is applied to the primary 37 thereof, a negative voltage is produced by the secondary 40 thereof.

The total resistance of the sensing circuit 22, through which current produced by the thermal E.M.F. flows, is of a relatively low order (probably less than one-tenth of an ohm), and the thermal E.M.F. is substantially constant at approximately one-half millivolt. However, the quality of the pressing electrical contact between the heated nickel probe 18 or 19 and the palladium cap 16 caused by the resiliency of the associated spring 11 will vary from time to time. Therefore, the thermal E.M.F. produced between the nickel probe 18 or 19 and cap 16 and amplified by the transformer 38 has been found to vary from one comb 10 to another. This makes it necessary to provide additional amplification means in order to insure a more accurate indication of the presence or absence of the palladium caps 16—16.

Additional amplification is provided in the amplifying circuit 23 by utilizing one side of an unbiased 12AX7 type, twin triode amplifier tube, designated generally by the numeral 46, having a grounded cathode 48, which increased the potential approximately ten times. The other side of the triode tube 46 is used in a similar manner in an adjacent amplifying circuit 23. Due to ringing in the secondary 40 of the transformer 38, oscillations may result at the grid 47 of the triode tube 46 which oscillations might be amplified sufficiently to fire the thyratron 24 regardless of the polarity of the original signal produced by the thermal E.M.F. The effect of the ringing in the secondary 40 of the transformer 38 is preferably overcome by connecting a one megohm, one-fourth watt resistor 49 in series with the grid 47 thereof.

The triode tube 46 and the resistor 49, in series therewith, act as a partial rectifier and shape the pulses produced in the secondary 40 of the transformer 38. Thus, the triode tube 46 and the resistor 49 eliminate the effect of the ringing in the transformer 38 and amplify the positive signals slightly, while the negative signals are amplified with nearly the same gain as if the triode tube 46 were biased conventionally. The additional wave form-shaping by the positive peak-clipping action of the grid 47 of the triode tube 46 and the resistor 49 produces an aperiodic pulse, of a wave form as illustrated in the drawing, in the plate circuit of the triode tube 46. The plate 42 of the triode tube 46 is connected to a regulated B+ voltage supply, designated generally by the numeral 45, through a fifty-thousand ohm, two watt resistor 43.

The additional amplification and one-hundred and eighty degree phase reversal, introduced by the triode amplifier tube 46, result in an approximately fifty volt, positive signal being applied, through a one-tenth microfarad, four-hundred volt capacitor 51 and a one-hundred thousand ohm, one-fourth watt, grid-current-limiting resistor 52, to the grid 32 of the normally cut-off thyratron 24. Therefore, even though there may exist variations in this signal, the magnitude of the signal is consistently high enough to fire the thyratron 24, even though the thyratron is biased negatively, through a five-hundred thousand ohm, one-half watt resistor 60, at thirty volts by a variable power supply, designated generally by the numeral 50.

When the normally cut-off thyratron 24 is rendered conductive by the amplified output of the triode tube 46, the plate 53 of the thyratron, connected to the direct-current source 45 transmits an amplified unidirectional current, through a twenty-thousand ohm, two-watt, current-limiting resistor 65, to the relay 33 to energize and operate the relay 33. Each of the relays 33—33 controls the associated indicating circuit 27 and cooperates with other relays 33—33 to control the acceptance-rejection circuit 36. Since, direct current is connected to the plate 53 of the thyratron 24, the thyratron will continue to conduct after the amplified signal voltage is removed from the grid 32. Therefore to permit the relay 33 to return to an inoperative position, it is necessary to interrupt the plate circuit of the thyratron 24. This is accomplished by means of a switch 54 and a cam 55 associated with the comb-retaining fixture 17.

In each of the indicating circuits 27—27, one end of a line 56, containing an upper-contact indicating light 57, and an adjacent end of a line 58, containing a lower-contact indicating light 59, are connected to normally open, stationary contacts 61 and 62, respectively, of a double-throw, double-pole switch, designated generally by the numeral 63, of the relay 33. The opposite ends of the lines 56 and 58 are connected to a single-pole, double-throw switch 64. The switch 64 is actuated by a cam 66 controlled by the comb-retaining fixture 17, and is used to connect the lines 56 and 58 selectively to a single-pole, double-throw, selector switch 67 having a "comb-test" position or a "contact-test" position. When the switch 67 is in the "comb-test" position, the lines 56 and 58 form open circuits, and when the switch 67 is in the "contact-test" position, the lines 56 and 58 are connected to one side 70 of the output of a "filament and lamp" transformer, designated generally by the numeral 71.

One switch 72 of a pair of normally open, ganged, selector switches, designated generally by the numeral 73, in each of the indicating circuits 27—27, is connected in the line 56 in series with the associated upper-contact indicating light 57. One switch 76 of a pair of normally open, ganged, selector switches, designated generally by the numeral 77, in each of the indicating circuits 27—27, is connected in the line 58 in series with the associated lower-contact indicating light 59. The other switches 78 and 79 of each of the pairs of ganged switches 73 and 77 are connected in separate lines 81 and 82, all respectively, extending between respective normally closed stationary contacts 83 and 84, of the relay 33 in the associated indicating circuit 27, and a single-pole, double-throw switch 86.

A cam 85, controlled by the fixture 17, is used to actuate the switch 86, which, in turn, connects the lines 81 and 82 selectively through a current-limiting resistor 87 to one side of a coil 88 of a Western Electric type 276B, mercury-contact relay, designated generally by the numeral 91, in the acceptance-rejection circuit 36. The opposite side of the coil 88 of the relay 91 is connected to the ungrounded side of the output of the power supply 45. The opposite side of the output of the transformer 71, which is grounded, is connected to the movable contact 92 of the switch 63 of the relay 33. Therefore when any of the switches 72—72 or 76—76 are closed, the relay 91 will be energized by the power supply 45 from the ungrounded side of the output thereof through parallel circuits. Each of the parallel circuits may be formed by the coil 88, the resistor 87, the line 82 or 81, the contact 83 or 84, respectively, the movable contact 92 of the switch 63, and to the grounded side 70 of the output of the transformer 71. Accordingly, if any of the switches 72—72 or 76—76 are closed, indicating that a palladium contact cap should exist on each of the contact surfaces associated therewith, the relay 91 will remain energized until all of the relays 33—33 associated with the closed switches 72—72 or 76—76 are energized to disconnect all the parallel circuits to the coil 88. When the relay 91 is deenergized, an "acceptance" light 94, in the acceptance-rejection circuit 36, lights to indicate that on the side of the comb 10, under test, one of the palladium caps 16—16 are on each of the members 12—12 which are supposed to have one of the palladium caps 16—16 thereon.

*Operation*

In the operation of the hereinabove-described apparatus, a wire spring relay comb 10 consisting of twelve separate, copper-nickel contact members 12—12, each of which has an upper contact surface 13 and a lower contact surface 14, is placed in the comb-retaining fixture 17. The position of a handle 96 of the comb-retaining fixture 17 and orientation of an attached cam 97, and thus the orientation of the comb attached to the fixture 17, determines whether the upper twelve contact surfaces 13—13 are in pressing contact with the sensing probes 18—18 and thus in position to be tested, or if the lower twelve contact surfaces 14—14 are in pressing contact with the sensing probes 19—19 and thus in position to be tested. The position of the handle 97 and thus the orientation of the cam 85 determines if the coil 88 of the relay 91 is connected through the switch 86 to line 81 or line 82. Also, one of the indicating lamps 57 or 59 is used for each of the contact surfaces 13—13 or 14—14 of the comb 10, under test. Therefore, the position of the handle 96 and thus the cam 66 attached thereto will determine whether the switch 64 connects the lines 56—56, including the upper-contact indicating lamp 57—57, or the lines 58—58, including the lower-contact indicating lights 59—59, to the switch 67. Also, the manner in which a comb 10 is to be checked determines how the selector switches 67, 73—73 and 77—77 are set.

There is a choice of two procedures for checking the contact surfaces 13—13 and 14—14 of an individual comb 10. The ganged selector switches 73—73 and 77—77 associated with the contact surfaces 13—13 and 14—14, respectively, requiring palladium caps 16—16, according to the code of the particular relay comb 10 under test, may all be closed by hand or by instrumentalities (not shown) under the control of a programming card, in a conventional manner, while all other selector switches 73—73 and 77—77 remain open. The switch 67 may be set to the "comb-test" position.

Then the relay contact surfaces 13—13 or 14—14, on one side of the comb 10 to be tested, are brought into pressing contact with the associated individually heated nickel sensing probes 18—18 or 19—19. If dissimilar metals of different temperatures are in contact with each other, a thermocouple junction is formed which results in a thermoelectric voltage being generated. The type of metals and temperatures of both the junction between the sensing probes 18—18 or 19—19 of the sensing electrode 21 and the contact surfaces 13—13 or 14—14 being tested as well as the associated wiring determines the polarity and magnitude of the generated voltage. The resulting voltage is amplified by the amplifier circuit 23 and is fed to the detector circuit 26 which determines whether the contact under test is of the desired composition of metal and, therefore, is acceptable.

To accomplish this result, the generated voltage is fed through the relay 41, which produces an intermittent current, into the primary 37 of the step-up transformer 38. The secondary voltage of the transformer 38 is passed through the resistor 49 and is amplified by the triode amplifier tube 46. If the output of the triode amplifier tube 46 is of at least a predetermined magnitude and is the desired polarity, the negatively biased, normally cut-off thyratron 24 is rendered conductive by the amplified output of the triode tube 46. The plate 53 of the conductive thyratron 24, transmits an amplified unidirectional current to energize and operate the relay 33. The relay 33 controls the associated indicating circuit 27, and the relays cooperate to control acceptance-rejection circuit 36.

If all the contact surfaces 13—13 or 14—14 on the side of the comb 10, required by the particular code of the comb 10 under test, have palladium caps 16—16 thereon, the acceptance light 94 will light. The light 94 will give the operator a visual indication that, on the one side of the comb 10 under test, palladium contact caps 16—16 are on at least all of the members 12—12 which are required to have palladium caps 16—16 thereon according to the particular code of the comb. The contact surfaces on the opposite side of the comb 10 may be tested in a similar manner.

In the event that the comb 10 being tested is found to be defective, the operator can determine which of the contact surfaces 13—13 and 14—14 are defective if the selector switch 67 is placed in the "contact-test" position and all of the twenty-four selector switches 73—73 and 77—77 are closed. When the switches 67, 73—73 and 77—77 are in that position and the handle 96 of the fixture 17 is moved so that the upper contact surfaces 13—13 are in pressing engagement with the upper sensing probes 18—18, the corresponding set of indicator lights 57—57 will indicate the upper contact surfaces 13—13 having palladium caps 16—16 thereon. When the handle 96 is moved so that the lower contact surfaces 14—14 are in pressing engagement with the lower sensing probes 19—19, the corresponding set of indicator lights 59—59 will indicate the lower contact surfaces 14—14 having palladium caps 16—16 thereon.

As discussed above, the wire spring relay combs 10—10 are so constructed that, when palladium contact caps 16—16 are not present, the associated copper-nickel block 12 will be placed in pressing contact with the sensing probes 18—18 and 19—19 of the sensing electrode 21. The polarity of the resulting thermoelectric voltage is such that a negative signal is applied to the grid 32 of the thyratron 24. Since, a negative signal will not cause the thyratron 24 to conduct, the relay 33 connected to the plate 53 of the thyratron 24 will remain deenergized and the associated indicating lamps 57 and 59 will not light.

It should be noted that a relatively small capacitor (not shown) is connected across each pair of controlling contacts throughout the apparatus to prevent the thyratrons 24—24 from firing due to voltage transients sent out from solenoids and switches when push buttons (not shown) in the control circuit of the apparatus are pushed to start, stop or actuate some part thereof.

By the selection of an appropriate metal for the sensing electrode 21 as well as the parameters of temperature of the sensing electrode 21 and bias on the thyratron 24, detecting apparatus embodying certain principles of the present invention could be used to detect a wide variety of metals or metal alloys. The versatility of such detecting apparatus is enhanced by the fact that the geometry of the piece of metal being tested is not a limiting factor. However, apparatus embodying the principles of the present invention have their greatest utility in determining the presence or absence of thin layers or coatings of certain metals on a different type of metal.

It should be noted that the term metal as used in the descriptive portion of the specification and appended claims is intended to include metal alloys as well as elemental metals.

It is to be understood that the above-described arrangements are simply illustrative of the application of the principles of the inventions. Numerous other arrangements may be devised by those skilled in the are which will embody the principles of the inventions and fall within the spirit and scope thereof.

What is claimed is:

1. A detector for determining the presence of relatively thin layers of a specific precious metal on opposite sides of a member of dissimilar metal of an electrical contact of electrical equipment, which comprises a furcated sensing electrode normally positioned astraddle an electrical contact of electrical equipment, said sensing electrode having a pair of sensing probes constructed of a specific reference metal projecting on opposite sides of the contact under test, means for causing relative movement between the contact and the sensing probes of the sensing electrode for selectively causing pressing contact between one of the sensing probes and the corresponding side of the electrical contact and subsequently the other sensing probe and the corresponding side of the contact, means for heating said sensing probes to a predetermined temperature so that thermoelectric voltages are generated at the junctions between the heated sensing probes and electrical contact, the polarities and the magnitudes of the voltages being dependent upon the type of metal engaging the sensing probes and the differences in the temperatures of the probes and the metal contacted thereby, and indicating means for connection with the sensing probes and the electrical contact, said indicating means being designed to sense the polarity and the order of magnitude of the voltage.

2. A detector for determining the presence of relatively thin layers of a specific precious metal on opposite sides of a member of dissimilar metal of an electrical contact of a wire spring relay comb, which comprises a furcated sensing electrode normally positioned astraddle an electrical contact of a wire spring relay comb under test, said sensing electrode having a pair of sensing probes constructed of a specific reference metal projecting on opposite sides of the contact under test, means for causing relative movement between the contact and the sensing probes of the sensing electrode for selectively causing resilient pressing contact between one of the sensing probes and the corresponding side of the electrical contact, means for heating said sensing probes to a predetermined temperature so that a thermoelectric voltage is generated at each junction between the heated sensing probe and electrical contact, the polarity and the magnitude of the voltage being dependent upon the type of metal engaging the sensing probe and the difference in the temperatures of the probe and the metal contacted thereby, and indicating means for connection with the sensing probes and the electrical contact, said indicating means being designed to sense the polarity and the order of magnitude of the voltage to determine if a thin layer of a specific precious metal is on the contact.

3. A detector for determining the presence of relatively thin layers of a palladium on opposite sides of a member of dissimilar metal of an electrical contact of electrical equipment, which comprises a furcated sensing electrode normally positioned astraddle an electrical contact under test, said sensing electrode having a pair of sensing probes constructed of nickel projecting on opposite sides of the contact under test, means for causing relative movement between the contact and the nickel sensing probes of the sensing electrode for selectively causing pressing contact between one of the sensing probes and the corresponding side of the electrical contact, means for heating said sensing probes to a predetermined temperature so that a thermoelectric voltage is generated at the junction between the heated nickel sensing probe and electrical contact, the polarity and the magnitude of the voltage being dependent upon the type of metal engaging the nickel sensing probe and the differences in the temperatures of the probe and the metal contacted thereby, and indicating means for connection with the sensing probes and the electrical contact, said indicating means being designed to sense the polarity and the order of magnitude of the voltage to determine if a thin layer of palladium is on the contact and in engagement with one of the nickel probes.

4. A detector for determining the presence of relatively thin caps of a specific precious metal on opposite sides of a contact element of dissimilar metal secured fixedly to a free extremity of a wire spring of a wire spring relay, which comprises a furcated sensing electrode normally positioned astraddle a contact element of a wire spring relay comb under test, said sensing electrode having a pair of sensing probes constructed of a specific reference metal projecting on opposite sides of the contact element under test, means for causing relative movement between the contact element and the sensing probes of the sensing electrode for selectively causing resilient pressing contact between one of the sensing probes and the corresponding side of the contact element, means for heating said sensing probes to a predetermined temperature so that a thermoelectric voltage is generated at the junction between the sensing probe and contact element, the polarity and the magnitude of the voltage being dependent upon the type of metal engaging the sensing probe and the differences in the temperatures of the sensing probe and the metal contacted thereby, and indicating means for connection with the sensing probes and the contact element, said indicating means being designed to sense the polarity and the order of magnitude of the voltage.

5. A detector for determining the presence of a relatively thin layer of a specific metal on the surface of a member of a dissimilar metal, which comprises a relatively low-impedance low-potential sensing circuit, said sensing circuit including a sensing probe constructed of a reference metal, means for heating said sensing probe to a predetermined temperature, means for causing relative movement between the surface of the member of metal and the sensing probe to place the sensing probe in pressing contact with the surface under test, a thermoelectric potential being generated between the junction of the probe and the surface of the member under test so that thermoelectric current will flow in the sensing circuit, a relatively high-ratio step-up transformer having a primary thereof connected in said sensing circuit, means connected in said sensing circuits for interrupting the thermoelectric current at a predetermined rate and thus causing intermittent current flows in the primary of the step-up transformer as heat is conducted through the thin layer of metal, a resistance of a predetermined value connected to the one side of the secondary of the transformer, an unbiased triode amplifier tube being connected to the side of the secondary of the transformer through the resistor so that the secondary voltage of the transformer is amplified by the triode amplifier tube and is aperiodic, and a detector circuit connected to the plate of the triode tube for detecting if the amplified voltage output of the triode amplifier tube is of a predetermined polarity and falling with a predetermined voltage range and thus if the relatively thin layer of a specific metal is present on the surface of the member under test.

6. A detector for determining the presence of a relatively thin layer of a specific metal on the surface of a member of a dissimilar metal, which comprises a relatively low-impedance low-potential sensing circuit, said sensing circuit including a sensing probe constructed of a reference metal, means for causing relative movement between the surface of the member of metal, the surface of which is under test, and the sensing probe to place the sensing probe in pressing contact with the surface under test, means for maintaining said sensing element at a predetermined temperature for producing thermoelectric potential between the juncture of the probe and the surface of the member under test and thus thermoelectric current in the sensing circuit, a relatively high-ratio step-up transformer having a primary thereof connected in said sensing circuit, means connected in said sensing circuit for interrupting the thermoelectric current at a predetermined rate and thus causing intermittent current flows in the primary of the step-up transformer as heat is conducted through the thin layer of metal, a resistance of a predetermined value connected to the one side of the secondary of the transformer, an unbiased triode amplifier tube having a grounded cathode, the grid of the triode amplifier tube being connected to the side of the secondary of the transformer through the resistor so that the secondary voltage of the transformer is amplified by the triode amplifier tube and is aperiodic, a condenser connected to the plate of the triode amplifier tube, a normally cut-off thyratron, a grid of the thyratron connected to the plate of the triode tube through the condenser, a resistor connected between the condenser and the grid of the thyratron to limit the grid current thereof, a current source connected to the plate of the thyratron, an indicating circuit, a relay connected in the plate circuit of the thyratron to control the indicating circuit, and means for biasing the thyratron with a voltage of a predetermined polarity and magnitude, so that an amplified voltage output of the triode amplifier tube of a predetermined polarity and falling within a predetermined voltage range will cause the normally cut-off thyratron tube associated therewith to be rendered conductive so that the plate of the thyratron transmits an amplified unidirectional current to the relay to actuate the relay which, in turn, controls the indicating circuit.

7. A detector for determining the presence of relatively thin caps of a specific precious metal on opposite sides of members of dissimilar metal of contacts of electrical equipment, which comprises relatively low-impedance low-potential sensing circuits, said sensing circuits including a grounded furcated sensing electrode straddling the contacts of the electrical equipment under test, said sensing electrode having sensing probes constructed of a specific reference metal projecting on opposite sides of the contacts under test, means for causing relative movement between the contacts of the electrical equipment under test and the sensing probes of the sensing electrode for selectively causing pressing contact between the sensing probes on one side of the electrical contacts and the corresponding sides of the contacts and subsequently the sensing probes on the other sides of the contacts and the corresponding sides of the contacts closing the sensing circuits, means for heating said sensing element to produce thermoelectric currents in the sensing circuits, a relatively high-ratio step-up transformer connected in each of said sensing circuits, means connected in said sensing circuits for interrupting the thermoelectric currents and thus causing intermittent current flows in the primaries of the step-up transformers, one side of the secondary of each of the transformers being grounded, a resistance of a predetermined value connected to the other side of the secondary of each of the transformers, unbiased triode amplifier tubes having grounded cathodes, the grids of one of the triode amplifier tubes being connected to the other side of each of the secondaries of the transformers through one of the resistors so that the secondary voltages of the transformers are amplified by the triode amplifier tubes, a condenser connected to the plate of each of the triode amplifier tubes, a plurality of normally cut-off shield-grid thyratrons, a grid of one of the thyratrons connected to the plate of each of the triode tubes through one of the condensers, a resistor between each of the condensers and the associated grid of each of the thyratrons to limit the grid currents thereof, a current source connected to the plate of each of the thyratrons, an acceptance-rejection circuit for the electrical equipment under test, an indicating circuit associated with each of the sensing circuits, a relay in each of the indicating circuits connected in the plate circuit of each of the thyratrons, a plurality of selector switches in said indicating circuits, the relays cooperating to control the acceptance-rejection circuit through selector switches, and means for biasing each of the thyratrons with a voltage of a predetermined polarity and magnitude, so that all of the amplified voltage outputs of the triode amplifier tubes which are of a predetermined polarity and fall within a predetermined voltage range cause the normally cut-off thyratron tubes associated therewith to be rendered conductive so that the plates of each of the thyratrons associated with a sensing probe in engagement with an acceptable contact cap transmit an amplified unidirectional current to the associated relay to actuate the relay which, in turn, causes the associated indicating circuit to be deenergized and stop current flow through the selector switch associated with each of the contacts on which it is desirable to have one of the caps to control the acceptance-rejection circuit.

8. A detector for determining the presence of relatively thin caps of a specific precious metal on opposite sides of members of dissimilar metal of contacts of electrical equipment, which comprises relatively low-impedance low-potential sensing circuits, said sensing circuits including a grounded furcated sensing electrode straddling the contacts of the electrical equipment under test, said sensing electrode having sensing probes constructed of a specific reference metal projecting on opposite sides of the contacts under test, means for causing relative movement between the contacts of the electrical equipment under test and the sensing probes of the sensing electrode for selectively causing pressing contact between the sensing probes on one side of the electrical contacts and the corresponding sides of the contacts and subsequently the sensing probes on the other sides of the contacts and the corresponding sides of the contacts closing the sensing circuits, means for heating said sensing element to produce thermoelectric currents in the sensing circuits, a relatively high-ratio step-up transformer connected in each of said sensing circuits, means connected in said sensing circuits for interrupting the thermoelectric currents and thus causing intermittent current flows in the primaries of the step-up transformers, one side of the secondary of each of the transformers being grounded, a resistance of a predetermined value connected to the other side of the secondary of each of the transformers, unbiased triode amplifier tubes having grounded cathodes, the grids of one of the triode amplifier tubes being connected to the other side of each of the secondaries of the transformers through one of the resistors so that the secondary voltages of the transformers are amplified by the triode amplifier tubes, a condenser connected to the plate of each of the triode amplifier tubes, a plurality of normally cut-off shield-grid thyratrons, a grid of one of the thyratrons connected to the plate of each of the triode tubes through one of the condensers, a resistor between each of the condensers and the associated grid of each of the thyratrons to limit the grid currents thereof, a current source connected to the plate of each of the thyratrons, an acceptance-rejection circuit for the electrical equipment under test, an indicating circuit associated with each of the sensing circuits, a relay in each of the indicating circuits connected in the plate circuit of each of the thyratrons, a plurality of selector switches in said indicating circuits, a plurality of indicator lights in said indicating circuits, the relays cooperating to control the acceptance-rejection circuit through some of said selector switches, and means for biasing each of the thyratrons with a voltage of a predetermined polarity and magnitude, so that all of the amplified voltage outputs of the triode amplifier tubes which are of a predetermined polarity and fall within a predetermined voltage range cause the normally cut-off thyratron tubes associated therewith to be rendered conductive so that the plates of each of the thyratrons associated with a sensing probe in engagement with an acceptable contact cap transmit an amplified unidirectional current to the associated relay to actuate the relay which, in turn, causes a portion of the associated indicating circuit to be energized to light an associated indicator light and causes a portion of the associated indicating circuit to be deenergized and stop current flow through some of the selector switches associated with each of the contacts on which it is desirable to have one of the caps to control the acceptance-rejection circuit.

References Cited in the file of this patent

UNITED STATES PATENTS

| | | |
|---|---|---|
| 2,335,369 | Wallin | Nov. 30, 1943 |
| 2,750,791 | Hanysz et al. | June 19, 1956 |
| 2,852,850 | Martin | Sept. 23, 1958 |
| 2,924,771 | Greenberg et al. | Feb. 9, 1960 |